Aug. 26, 1924.                     1,506,576
                C. G. GARRIGUS
          ELECTRICAL INDICATING MARKER
            Original Filed Nov. 6, 1922
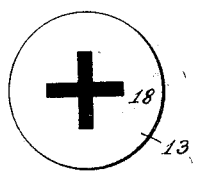
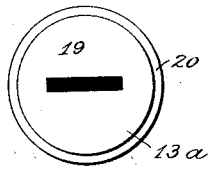
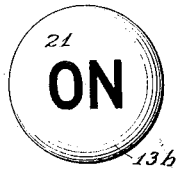
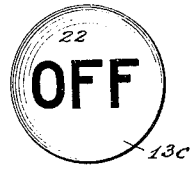
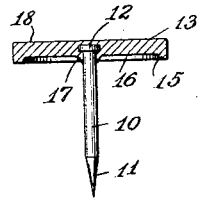
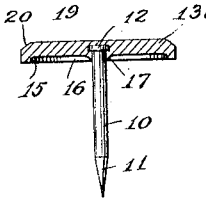
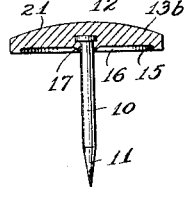
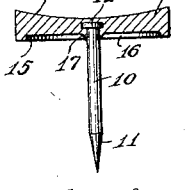
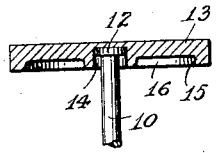
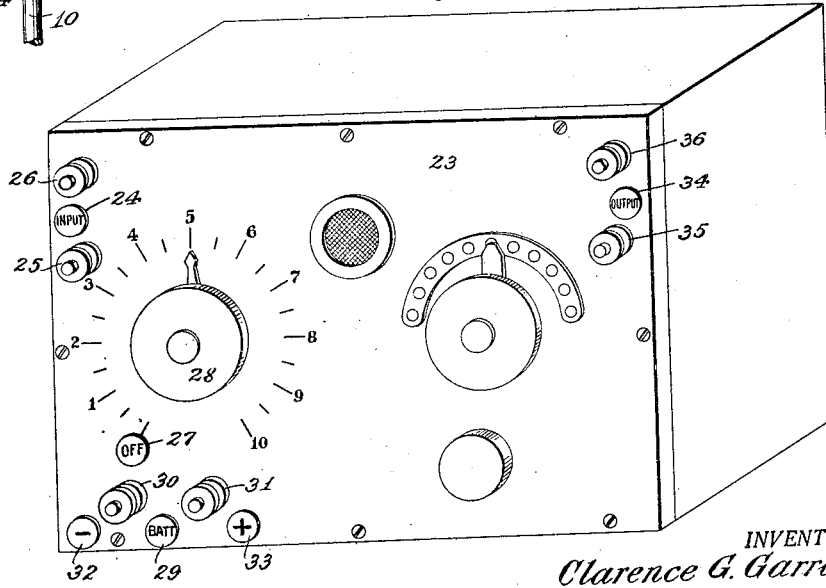
INVENTOR.
Clarence G. Garrigus
BY H. G. Manning
ATTORNEY Patented Aug. 26, 1924.

1,506,576

UNITED STATES PATENT OFFICE.

CLARENCE G. GARRIGUS, OF BRISTOL, CONNECTICUT.

ELECTRICAL INDICATING MARKER.

Application filed November 6, 1922, Serial No. 599,281. Renewed July 12, 1924.

*To all whom it may concern:*

Be it known that I, CLARENCE G. GARRI-GUS, a citizen of the United States, and a resident of Bristol, county of Hartford, and State of Connecticut, have invented certain new and useful Improvements in Electrical Indicating Markers, of which the following is a specification.

This invention relates to electrical apparatus, and more particularly to an indicating marker adapted to be attached to such apparatus for identifying conductor terminals, regulating means, and other elements.

One object of this invention is to provide an indicating marker for electrical apparatus, having an indicating section adapted to lie on the surface of the apparatus and an attaching section adapted to be embedded below the surface of said apparatus.

A further object is to provide a device of the above nature which will be simple, cheap to manufacture, easy to install, and very efficient and durable in use.

With these and other objects in view, there have been illustrated on the accompanying drawings several forms in which the invention may be conveniently embodied in practice.

Figs. 1 and 2 represent a top plan view and a side sectional view respectively of one form of indicating marker embodying the invention.

Figs. 3 and 4 represent a top plan view and a side sectional view of a second form of indicating marker embodying the invention.

Figs. 5 and 6 represent a top plan view and a side sectional view of a third form of indicating marker embodying the invention.

Figs. 7 and 8 represent a top plan view and a side sectional view respectively of a fourth form of indicating marker embodying the invention.

Fig. 9 represents a perspective view of the casing of a radio receiving set showing a plurality of the indicating markers applied to the panel thereof.

Fig. 10 is a sectional view, on an enlarged scale, of a portion of the indicating marker shown in Fig. 1, as it appears before the base has been swaged over upon the head of the attaching pin.

In the manufacture of electrical equipment in the past, when it was desired to identify the various terminals, etc., it has been customary to stamp or mark the proper indicia directly on the surface of the apparatus. This method of identification, however, has proven unsatisfactory in use, on account of the liability of such marks to wear off, or become covered with dirt so as to be illegible after a short period of use.

According to the present invention, the above and other disadvantages have been entirely avoided by the use of separate indicating means adapted to be secured to the surface of the apparatus or part to be identified.

Referring now to the drawings in which like reference numerals denote corresponding parts throughout the several views, the numeral 10 indicates a cylindrical attaching pin having a conical point 11 at one end, and an enlarged cylindrical head 12 at the other end, as clearly shown in Figs. 1 to 8 of the drawings. Four different forms of indicating disk or marker are herein illustrated, said disks being indicated in said figures by the numerals 13, 13ª, 13ᵇ, 13ᶜ. In each form of disk, the head 12 of the pin 10 is inserted in a recess 14 of the disk, which is preferably of metal, and the sides of the recess are bent inwardly and swaged over around the head 12 to fasten the pin 10 rigidly and permanently to the disk.

In use, the pin 10 serves as an attaching means to hold the marker rigidly in position on the surface of the particular piece of electrical apparatus to which it is to be secured. If the material of said apparatus is relatively soft, such as wood, the marker may be directly hammered into place. If, however, the material is hard, such as slate, bakelite, or vulcanite, a hole may first be drilled, in which the pin may be secured in any suitable manner, as by cement.

The shape of the bases of the four forms of indicating disk is the same in each instance, and comprises a flat outer annular rim or flange 15, an intermediate annular groove 16, and an inner conical section 17 where the metal is swaged around the pin 10.

The top surfaces of the four forms of indicating disk, however, are of different shapes. The top 18 of the disk shown in Figs. 1 and 2 is made entirely flat, and is provided with the symbol "+" marked thereon; the top 19 of the disk shown in Figs. 3 and 4 has a flat central portion and a beveled edge 20, the central portion being provided with the symbol "—" marked thereon; the top 21 of the disk shown in Figs. 5 and 6 is convex, and is provided with the word "On" marked thereon; while the top 22 of the disk shown in Figs. 7 and 8 is concave, and has the word "Off" marked thereon.

Fig. 9 illustrates one particular electrical apparatus to which the invention may be applied in use. In this figure which shows the casing of a wireless set, six indicating markers embodying the invention have been attached to a panel 23. A marker 24 provided with the word "Input", and located between the binding posts 25 and 26, indicates that these binding posts are to be connected with the input conductors of the circuit. A marker 27 containing the word "Off" is located below a central knob 28, and indicates that when the controlling pointer of the knob 28 is opposite this point, the current passing into the instrument will be zero. A marker 29 containing the word "Batt." indicates that the adjacent terminals 30 and 31 lead to the battery which delivers current to the radio receiving set. Markers 32 and 33 containing the symbols "—" and "+" indicate the respective negative and positive terminals of said battery. A marker 34 containing the word "Output" and located between terminals 35 and 36 at the right of the panel 23 indicates that these terminals lead to the output circuit of the radio set.

It will be understood that while the present invention is illustrated as applied to a wireless set, it may be employed equally well on other forms of electrical apparatus such as ammeters, voltmeters, wattmeters, switch boards, cutout panels, etc.

While there has been disclosed in this specification, several forms in which the invention may be embodied, it is to be understood that these forms are shown for the purpose of illustration only and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In an indicating marker for electrical apparatus, a metallic disc having a convex upper surface and a flat under surface, a rim depending from the edge of said under surface, a concentric rim at the center of said under surface and surrounding a recess extending upwardly into said disc, a pin under said disc, said pin having a head seated in said recess, the central rim having its sides bent inwardly and swaged over around the head of said pin to fasten the pin rigidly to the disk, said pin being adapted to be driven into the electrical apparatus adjacent the point to be marked.

In testimony whereof, I have affixed my signature to this specification.

CLARENCE G. GARRIGUS.